Sept. 11, 1945.  E. S. HEBELER  2,384,618
ARC WELDING APPARATUS
Filed July 23, 1942  2 Sheets-Sheet 1
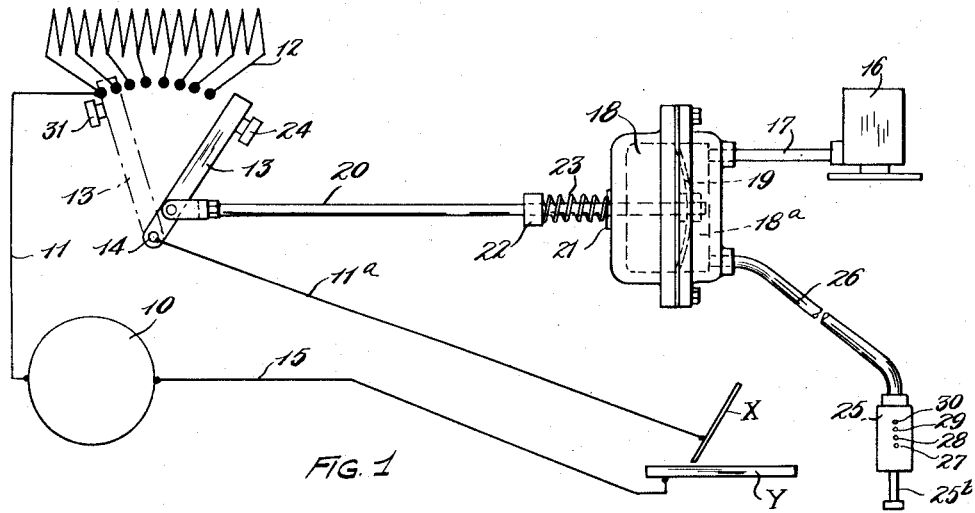
FIG. 1
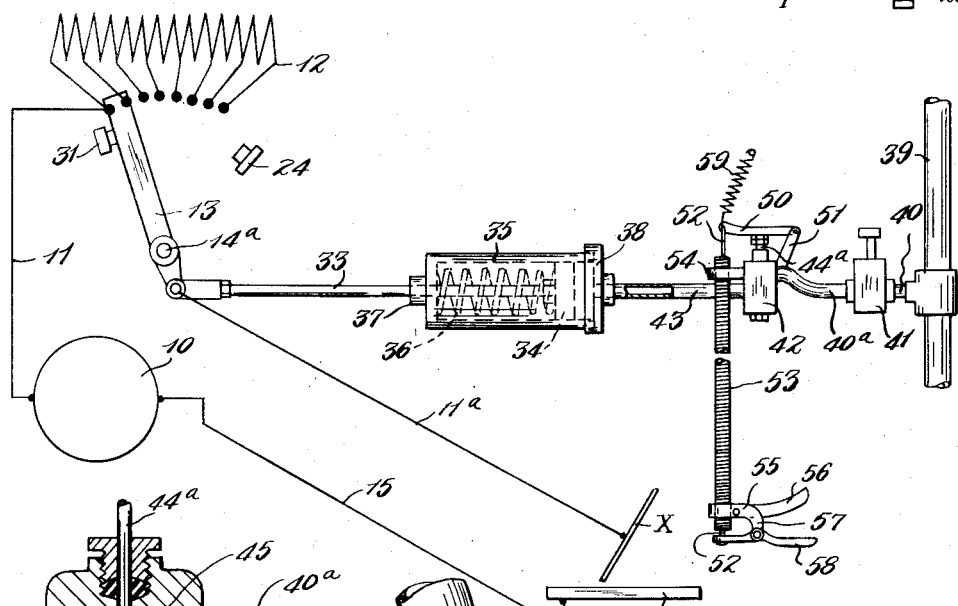
FIG. 3
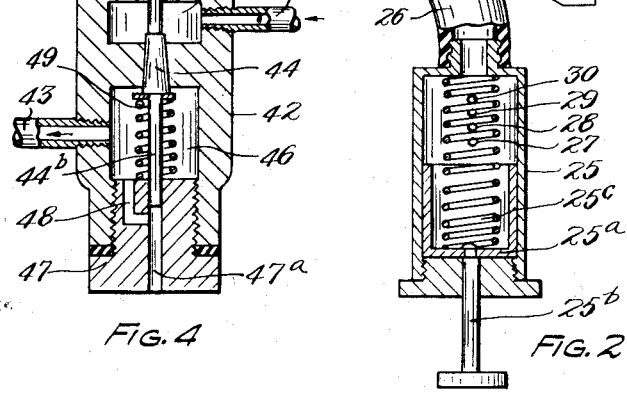
FIG. 4
FIG. 2
INVENTOR.
EDWARD S. HEBELER
BY Hull & West
ATTORNEYS Sept. 11, 1945.    E. S. HEBELER    2,384,618
ARC WELDING APPARATUS
Filed July 23, 1942    2 Sheets-Sheet 2
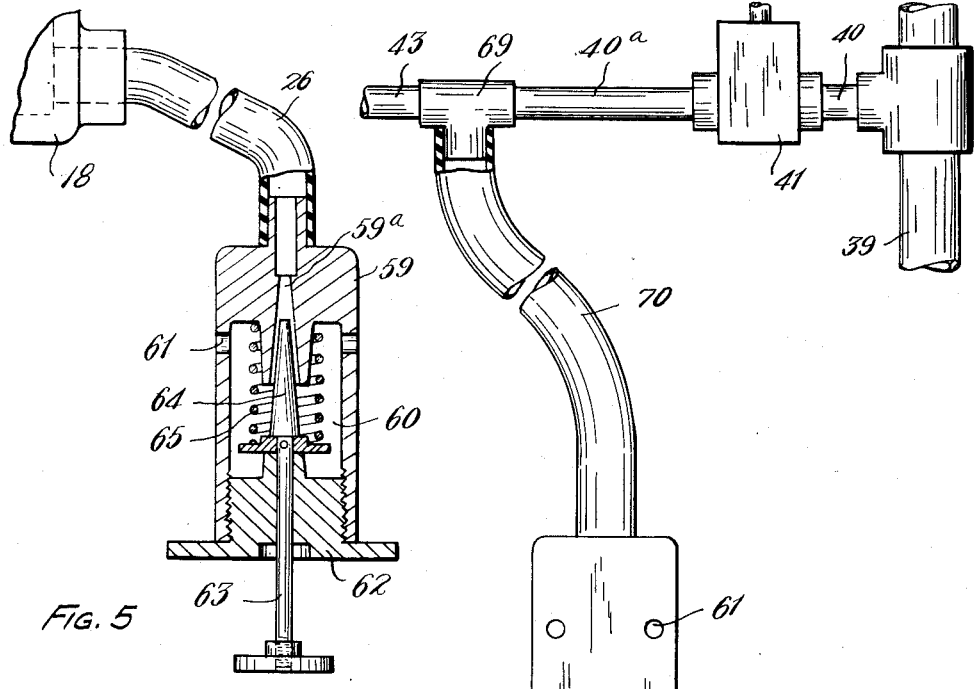
Fig. 5
Fig. 7
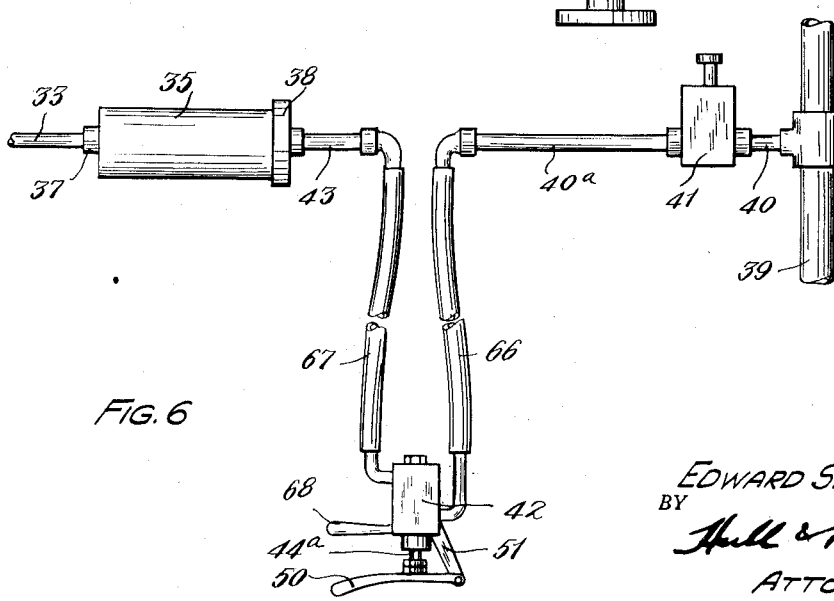
Fig. 6
INVENTOR.
EDWARD S. HEBELER
BY
Hull & West,
ATTORNEYS Patented Sept. 11, 1945

2,384,618

UNITED STATES PATENT OFFICE 2,384,618

ARC WELDING APPARATUS

Edward S. Hebeler, Williamsville, N. Y., assignor, by mesne assignments, of one-half to Unit Rays, Inc., Cleveland, Ohio, a corporation of Ohio Application July 23, 1942, Serial No. 451,983

4 Claims. (Cl. 201—48)

This invention relates to the art of arc welding with the use of a welding rod or wire which serves as one of the electrodes, and more particularly to means or devices whereby the operator is enabled to variably control the current employed by him in welding operations without having to leave the particular location where he may be working.

Devices have been suggested for enabling welding operators to accomplish this result, but all of these devices with which I am acquainted involve complicated arrangements of electrical parts or circuits and are expensive of production.

The general purpose and object of my invention is to provide a simple and relatively inexpensive construction of apparatus or devices which will enable the operator to effect variable control of the welding current in the manner described and, more limitedly, to enable him to effect this variable control by means of a device or apparatus embodying pneumatic means for operating the element which controls the supply of current to the work. While my invention is capable of more general application, it will be found to be particularly useful in enabling the operator to suitably reduce or "fade out" the welding current when approaching the end of a seam weld before withdrawing the arc, thereby preventing the formation of what are known in the art as "craters" in the ends of such seams.

I accomplish the foregoing objects in and through the construction and arrangements of parts shown in the drawings forming part hereof wherein Fig. 1 shows a diagrammatic elevational view of one form of apparatus or device for realizing my invention; Fig. 2 a central longitudinal sectional view through a schematic form of bleeder valve included in said apparatus; Fig. 3 a view, similar to Fig. 1, of a modified form of my invention; Fig. 4 a central longitudinal sectional view through a schematic form of pressure control valve embodied in the apparatus shown in Fig. 3; Fig. 5 a diagrammatic elevational view of a portion of the apparatus or device shown in Fig. 1, but with a modified form of bleeder valve; Fig. 6 a diagrammatic elevational view of a portion of the apparatus or device shown in Fig. 3, but with a modified form of pressure control mechanism; and Fig. 7 a view showing a portion of the device or apparatus of Fig. 3 equipped with a still further form of pressure control mechanism.

Describing first the embodiment of my invention shown in Figs. 1 and 2, 10 denotes a welding current generator from which a conductor 11 leads to a variable current controlling device, the same being shown as a rheostat 12 consisting of a plurality of resistance grids, to one end of which rheostat the said conductor is connected, 13 denotes a contact blade pivoted at one end, as shown at 14, and adapted, by its movement, to vary the resistance in the current flowing through the conductor 11, conductor 11ª, the electrode rod or wire X and the conductor 15 which connects the generator and the work, indicated at Y.

For the purpose of enabling the operator to effect any desired variation in the current used for welding, without leaving the location of his work and without having to remove his hand from the welding rod holder, I have provided the following pneumatic equipment: 16 denotes a vacuum pump operating through a pipe 17 to exhaust air from and produce a partial vacuum within a chamber 18ª provided between one end of a housing 18 and an abutment in the form of a flexible diaphragm 19 extending across the said housing. 20 denotes a rod connected at one end to the diaphragm and at its other end to the sliding contact blade 13 above the pivotal support therefor. The rod 20 extends through a suitable guide 21 carried by the housing 18, between which guide and a stop 22 on said rod a coiled spring 23 is interposed, said spring tending to move the rod 20 in a direction to cause the contact blade 13 to move from the "off" point stop 24 in a direction to increasingly cut out the resistance, thereby to effect a corresponding variation in the amount of current employed in the welding operation.

25 denotes the casing of a graduating bleeder valve connected by a suitable hose or other flexible tube 26 with the chamber 18ª and having a manually operated sliding cylinder valve body 25ª provided with an operating stem 25ᵇ and adapted by its outward movement to uncover one or more of the bleeder holes 27, 28, 29, 30, thereby to vary the degree of vacuum created within the said chamber by the pump 16, which is preferably driven at constant speed. A spring 25ᶜ tends to hold the valve body 25ª in the position shown in Fig. 2, whereby all of the bleeder holes are uncovered and the vacuum pump is ineffective to move the diaphragm 19 against the resistance of the spring 23.

With the parts constructed and arranged as shown and described and with the vacuum pump in operation and with the valve body in the position shown in Fig. 2, the vacuum pump will be ineffective to operate the diaphragm 19, due to the fact that the bleeder holes 27—30 are uncovered, and the spring 23 will move the sliding contact blade 13 to the dotted line position thereby to engage the stop 31, whereupon current will be supplied at full strength to the electrode and the work. By moving the stem 25 upwardly, the operator is enabled to cover one or more of the bleeder openings with the cylindrical portion of the valve body 25ᵃ, thereby to render the action of the vacuum pump upon the diaphragm increasingly effective, and to effect thereby a corresponding reduction in the current supplied to the welding arc. By completely covering all of the bleeder openings, the vacuum pump will be enabled to move the diaphragm 19 to the position indicated in Fig. 1, wherein the contact blade 13 will have struck the "off" point 24, whereupon the welding current will be entirely cut off or "faded out."

In actual practice, any well known means will be provided for automatically retaining the stem 25ᵇ and the valve body 25ᵃ in any position to which they may be elevated by the operator as, for instance, any known form of ratchet and pawl mechanism.

In the modification shown in Figs. 3 and 4, instead of using vacuum means for controlling and for "fading out" the welding current, I employ super-atmospheric pressure-operated means for accomplishing the same result. In this view, the welding current generator, the conductors which lead to the electrode and to the work, and the electrode and the work, as well as the sliding contact blade and the stops therefor and the resistance—all are designated by the same numerals which are employed to designate these parts respectively on Fig. 1. However, instead of employing a diaphragm operated by a vacuum to vary the strength of the current forming the arc, I accomplish the same current regulations by the use of compressed air operating against the opposition of a spring.

The sliding contact blade in Fig. 3 is shown as pivotally supported at 14ᵃ above its lower end; and with the said contact blade in the position shown in full lines, the maximum current will be supplied to the welding arc. The lower end of the contact blade 13 is pivotally connected to a rod 33 which is connected at its opposite end to an abutment in the form of a piston 34 mounted within a cylinder 35, there being a coiled spring 36 surrounding the piston rod within the cylinder, said spring being interposed between one end of the piston and a supporting guide 37 provided therefor at the end of the cylinder opposite the head 38.

When the piston is held by the spring 36 in the position shown in the drawings, the resistance will be cut out, and the maximum welding current will be supplied to the arc. However, in order to enable the operator to vary the strength of current forming the arc, the following construction is provided:

Fluid under pressure from any source, as from a compressed air main 39, is supplied through a pipe 40 and reducing valve 41 (where necessary) to the casing 42 of a graduating pressure-control valve assembly, such as shown schematically in Fig. 4. A tube 43 delivers air from said pressure control valve assembly through the cylinder head 38 and against the end of the piston adjacent to said head. 44 denotes a valve body mounted within the casing 42 and adapted, by its movement, to control the amount and pressure of air supplied from the casing through the tube 43 against the piston 34.

The valve body 44 is mounted on an operating stem 44ᵃ, which stem extends through a chamber 45 in the top of the casing 42 with which chamber the pipe 40ᵃ is connected. This chamber communicates, when the valve body is depressed, with the chamber 46 from which the pipe 43 leads to the cylinder head 38. The valve body 44 is provided with a lower guide stem 44ᵇ extending through the chamber 46 and mounted in a bore 47ᵃ provided therefor in a plug 47 which is threaded into the lower end of the casing 42. The bore 47ᵃ communicates with an L-shaped passage 48 formed in the said plug, the upper end of which passage communicates with the chamber 46 and the lower end of which passage is adapted to communicate with the bore 47ᵃ when the valve body 44 is held to its seat by the spring 49.

50 denotes a lever, one end of which is shown as pivoted to an arm 51 projecting from the casing and which lever extends across the top of the stem 44ᵃ of the valve, the top of the stem being held against the said lever by the spring 49, which tends to seat the valve body.

52 denotes a wire which is connected to the swinging end of the lever 50 and which extends through a flexible tube 53 having its upper end connected to and supported by a bracket 54 carried by the casing 42. The lower end of the tube is connected to a bracket 55 having a gripping member 56 supported thereby and preferably formed therewith. This bracket also has a depending arm 57 to which there is pivoted a lever 58, one end of which is connected to the wire 52 and the opposite end of which extends in proximity to the member 56 and constitutes a gripping member which can be conveniently grasped, together with the member 56, by the hand of the operator. 59 denotes a coiled spring which is connected at one end to the swinging end of the lever 50, thereby to assist the spring 49 in holding the valve body 44 seated when operating with full welding current.

With the parts constructed and arranged as described and as shown in Figs. 3 and 4, by moving the gripping members 56 and 58 toward each other the operator can draw the wire 52 downwardly, thereby to move the valve stem 44ᵃ downwardly and thus to increasingly and gradually vary the amount and pressure of compressed air supplied through the head of the cylinder 35, with a consequent variation in the throw of the piston and the movement of the contact blade 13 toward the stop 24, against the resistance of the spring 36.

It will be seen that the operator is thus enabled to vary the strength of current supplied to the welding arc, without leaving his welding position and also without the necessity for changing his welding rod with reference to the work. When his electrode approaches the end of a seam which he is welding, or when he may find it necessary to change his electrode, the operator can gradually reduce and finally entirely cut off or "fade out" the welding current, whereby the formation of a crater in the work will be avoided. The contact blade 13 will be restored to the full-current position shown in Fig. 3 when the operator releases his grip upon the gripping members 56 and 58, thereby enabling the spring 49 to seat the valve body 44 and vent, through the passage 48 and bore 47ᵃ the pressure fluid which has moved the piston 34 against the action of the spring 35.

The valves for controlling the amount of vacuum operating in the chamber 18ᵃ and for controlling the supply of pressure fluid through the head of the cylinder 35 are intended merely as illustrating more or less conventional constructions for accomplishing such controls and, in their details, form no part of the invention sought to be protected herein. If desired, means will be provided whereby the valve 44ª will be automatically retained in any position to which it may be moved by means of the gripping members 56, 58, as by the employment of any known form of ratchet-and-pawl mechanism.

In Fig. 5, I have shown a modification of the invention shown in Fig. 1 wherein a different construction of bleeder valve is employed, the parts of the apparatus shown in Fig. 1 which are repeated in Fig. 5 being designated by the reference numerals which are employed in the former figure. In this view, it will be noted that the pipe 26 communicates with a passage 59ª in the top of a casing 59, the said passage being adapted to communicate at its bottom with a chamber 60 within said casing, said chamber being provided with one or more bleeder openings 61. The bottom of the chamber 60 is closed by a plug 62 which is threaded into the bottom of the casing and within which plug there is reciprocably mounted a valve stem 63 carrying at its upper end a needle valve 64 which is adapted by its adjustment to control and entirely cut off the flow of air entering the passage 59ª from the chamber 60, thereby to vary the amount of vacuum operating upon the diaphragm 19. A coil spring 65 tends to normally hold the valve stem in its lowered position and the needle valve in its open position. In practice, the valve stem will be provided with means for automatically retaining the same in any position to which it may be moved by the operator, such as any of the well known ratchet and pawl devices.

The operation of the modification shown in Fig. 5 is substantially the same as the operation of the apparatus or device shown in Fig. 1. When the valve is in the position shown in Fig. 5, no vacuum will be produced in the chamebr 18ª which will suffice to operate the diaphragm 19, and the maximum current will be supplied to the welding arc. By pressing upwardly on the valve stem 63, the operation of the vacuum pump will be rendered increasingly effective in operating the diaphragm 19, with a corresponding reduction in the amount of current supplied to the welding arc. When the passage 59ª is completely closed, the vacuum pump will be operating with maximum efficiency upon the diaphragm 19, and the supply of current will be entirely cut off.

In Fig. 6 there is shown a further modification of my invention as set forth in Fig. 3, the parts which are common to Figs. 3 and 6 being designated by the numerals which are employed on the former figure. It will be noted that, in Fig. 6, instead of using the flexible tube 53 and wire 52, and locating the valve parts 42 and 50–54 in proximity to the cylinder 35, I have moved the valve casing 42 and its operating parts to a point adjacent to the work and have connected the valve casing by flexible tubes to the tubes 40ª and 43. The tube 40ª is connected with the chamber 45 in the casing 42 by means of a flexible tube 66, and the chamber 46 in the said casing is connected with the tube 43 by a flexible tube 67. The casing is provided with a handle or gripping member 68 which is arranged in such proximity to the lever 50 as to enable both of these members to be grasped by the hand of the operator, thereby to open the valve 44 more or less. In practice the valve stem 44ª in this modification, as well as that shown in Fig. 3, will be provided with means for automatically retaining the same in any position to which it may be moved by the operator, such as any of the well known ratchet and pawl devices.

In Fig. 7 there is shown a still further modification of the invention shown in Fig. 3, wherein the pipes 40ª and 43 are connected by means of a T 69, from the intermediate branch of which a flexible tube 70 leads to a valve control mechanism which may be identical with that shown in Fig. 5 and wherein said supply of pressure fluid through the cylindrical head 35 may be completely bled through the openings 61 in the casing 59. As the parts within the casing will be identical as to the construction and arrangement of the same with those shown in Fig. 5, the same will not be shown in detail in Fig. 7.

It will be obvious that the valve mechanism shown in Fig. 4 may be substituted for that shown in Fig. 1, in which case it will serve to vary the effect exerted upon the diaphragm 19 by the pump 16. When thus substituted, the tube 17 will be connected by a flexible tube (such as the tube 26) with the chamber 45 in the casing 42 and the chamber 46 will be connected by a flexible tube with the diaphragm chamber 18ª. As the valve 44 is opened, the stem 44ᵇ will close communication between the bypass 48 and the bore 47ª, and the amount of vacuum in the chamber 18ᵇ will be varied in accordance with the extent of the opening of said valve.

Having thus described my invention, what I claim is:

1. In combination with a source of current for an arc welding apparatus, a movable element for controlling said current, means for operating and controlling the position of said element, said means including a housing, a diaphragm extending across said housing, a rod connected at one end to said diaphragm, a chamber being formed between the said diaphragm and a wall of said housing, a vacuum pump, a pipe connecting the said pump with the said chamber, a flexible tube adapted to extend from said chamber to the place of work, and valve mechanism connected to the end of the tube opposite the portion connected to said chamber for varying the amount of vacuum created in said chamber by the said pump.

2. In combination with a source of current for an arc welding apparatus, a movable element adapted by its movement to vary the said current, and means for operating the said element, said means including a housing having a head, an abutment in said housing and extending thereacross, a rod connected at one end to the side of the abutment remote from said head and at its other end to the said movable element, a source of fluid pressure supply and a conduit connecting the same with the head of said housing, a second conduit also connected with the head of said housing, and a bleeder valve in the second conduit located adjacent to the place of welding.

3. In combination with a source of current for an arc welding apparatus, a movable element adapted by its movement to vary the said current, and means for operating the said element, said means including a housing having a head, an abutment in said housing and extending thereacross, a rod connected at one end to the side of the abutment remote from said head and at its other end to the said movable element, a source of fluid pressure supply and a conduit connecting the same with the head of said housing, a second conduit also connected with the head of said housing, a valve in the second conduit, and manually operable means for controlling said valve located adjacent to the place of welding.

4. In combination with a source of current for an arc welding apparatus, a movable element adapted by its movement to vary said current, and means for operating and controlling the position of said element, the said means including a housing having one end closed, an abutment extending across said housing and forming a chamber of variable capacity between one side thereof and said closed end, a reciprocable member connected to the said abutment and extending from the side thereof which is opposed to the side which faces the closed end of said housing and being connected at its opposite end to the said movable element, a fluid supply duct communicating with the aforesaid chamber, and means for varying the pressure of the fluid in said chamber, said means comprising a valve casing connected with the said chamber and having a port adapted to vent the said chamber to the atmosphere, a valve for controlling the said port and means located adjacent the place of welding for operating the said valve.

EDWARD S. HEBELER.